Patented July 17, 1928.

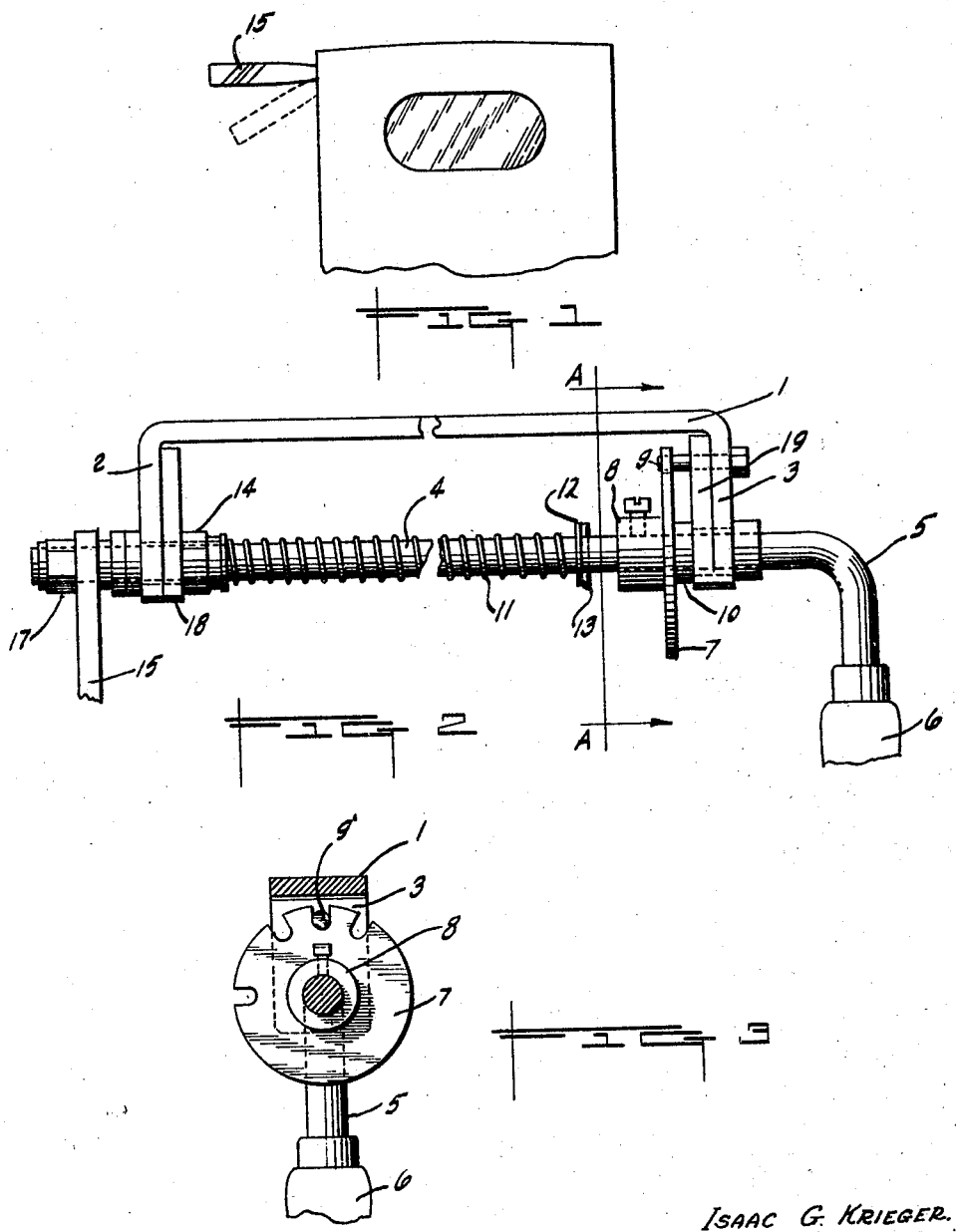

1,677,351

UNITED STATES PATENT OFFICE.

ISAAC G. KRIEGER, OF LODI, CALIFORNIA.

AUTOMOBILE SIGNALING DEVICE.

Application filed May 10, 1927. Serial No. 190,183.

This invention relates to an improved direction signal for automobiles and has for its object the provision of a signal of simple and rugged construction capable of positive action to indicate clearly to pedestrians and drivers of adjacent vehicles the intended movements of the automobile provided with the device.

A preferred form of the invention is shown in the accompanying drawings and described in the specification and appended claims, but it is to be understood that changes may be made within the scope of the claims without departing from the spirit of the invention.

In the accompanying drawing:

Fig. 1 shows the invention applied to the usual type of truck cab or enclosed type of pleasure automobile;

Fig. 2 shows a vertical plan view of the invention; and

Fig. 3 shows a vertical sectional view taken on the lines A—A of Fig. 2.

Referring more specifically to the drawings in which similar reference numerals are used to denote similar parts in each of the several views, the reference character 1 indicates a U-shaped supporting frame or bracket which is adapted to be secured to the frame of the vehicle. The bracket 1 is provided at each end with arms 2 and 3, through which aligned holes are drilled to receive a shaft 4, the latter being capable of both sliding and rotating movements. One end of the shaft 4 is bent at a convenient angle to the axis of the shaft to form a shank 5, to which an operating handle 6 is attached. A notched disk 7 is mounted upon the shaft adjacent to the arm 3, this disk having formed integral therewith a hub or collar 8. The disk is held against relative rotation on the shaft by means of a set-screw extending through the collar. The disk is spaced from the arm 3 by a washer or collar 10 loosely mounted on the shaft. A pin 9 is mounted on the arm 3 in a position to cooperate with the notches in the disk 7 to hold the shaft 4 in the various positions desired. Upon the shaft 4 is a coil spring 11 under compression, abutting at one end against a stationary disk 12 fixed to the shaft by a pin 13, the other end of the spring abutting against a loosely mounted collar 14. Reaction to the compressive force to which the spring 10 is subjected tends to slide the shaft 4 toward arm 3 and thereby maintain the pin 9 and the notches of disk 8 in locked operative relation.

A semaphore 15 is rigidly fixed to the outer end of the shaft 4 between a collar 16 and a nut 17. Plates 18 and 19 are fastened to arms 2 and 3 to support and reinforce as well as to furnish larger bearing surfaces for the shaft 4 in said arms.

The semaphore 15, is, of course, so placed that it will project beyond all portions of the truck cab or automobile body so as to be entirely visible to any adjacent drivers of vehicles. For convenience in the adjustment of the semaphore to the desired angles used to give the indications as to the different directions or other motions of the vehicle which are to be made, the semaphore and the handle are preferably arranged in a parallel relation in the same plane, so that even though the semaphore may be beyond the vision of the driver of the vehicle to which it is attached, a glance at the direction of the handle will indicate to him the exact direction in which the semaphore points. Consequently, the location of the device may be varied between very wide ranges, since it is unnecessary for the semaphore to be within the driver's range of vision.

In operation, the shaft 4 is moved to the left, as viewed in Fig. 2 by pressure upon the spring, thus disengaging the pin 9 from the notch in which it rested. By rotation of the shaft while thus disengaged, the semaphore may be rotated to the desired position of angular adjustment necessary to give the appropriate signal. Release of the pressure put upon the spring will automatically return the shaft to its original position where it becomes locked until the operator changes the position.

Having thus described my invention, what I claim is:

1. In a vehicle signal, a one-piece U-shaped bracket having arms and a connecting portion capable of attachment to the frame of a vehicle, a shaft rotatably and slidably mounted in the arms of said bracket, a coil spring under compression on said shaft, a notched disk fixed to said shaft adjacent to one of the bracket arms, a pin on the adjacent arm in position to normally engage one of the notches in the disk, a semaphore on one end of said shaft, means for holding the semaphore and shaft against relative movement, and a handle at the other end of said shaft for operating the latter, said disk being moved relatively to said pin during the adjustment of said signal.

2. A vehicle signaling device comprising spaced bearing members, a shaft rotatably and slidably mounted in said bearings, means for locking the shaft against rotation, the said locking means comprising a disk having a plurality of notches therein and fixed to the shaft adjacent one of and between said bearing members, a pin mounted on the adjacent bearing member and adapted to selectively cooperate with said notches when the shaft is in one position, spring means for urging the shaft in a direction to cause engagement between the pin and the notches, a handle for moving the shaft in a direction against the spring means to disengage the pin and notch and to rotate the shaft after disengagement, and a semaphore mounted upon one end of the shaft and rotatable therewith, said disk being moved relatively to said pin during the adjustment of said signal.

3. In a vehicle signal, a U-shaped bracket, a shaft rotatably and slidably mounted in the arms of said bracket, a coil spring under compression on said shaft, a notched disk fixed to the shaft adjacent one of said arms, a stationary pin mounted upon the adjacent arm in position to cooperate with the notches of the disk and lock the shaft against rotation, a semaphore fixed to one end of said shaft, and an operating handle mounted on the other end of said shaft for rotating the latter, said disk being moved relatively to said pin during the adjustment of said signal.

In testimony whereof I affix my signature.

ISAAC G. KRIEGER.